US006367076B1

(12) United States Patent
Imai et al.

(10) Patent No.: US 6,367,076 B1
(45) Date of Patent: Apr. 2, 2002

(54) COMPILING METHOD AND MEMORY STORING THE PROGRAM CODE

(75) Inventors: Toru Imai; Hiroko Fujii, both of Tokyo; Yoshio Masubuchi, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/266,872

(22) Filed: Mar. 12, 1999

(30) Foreign Application Priority Data

Mar. 13, 1998  (JP) .......................................... 10-063322

(51) Int. Cl.[7] ................................................ G06F 9/45
(52) U.S. Cl. ...................... 717/152; 717/143; 717/146; 717/154; 712/234; 712/215; 712/206
(58) Field of Search ................................ 717/7, 4, 5, 6, 717/8, 9; 712/233, 234, 229, 214, 215, 206

(56) References Cited

U.S. PATENT DOCUMENTS 5,142,681 A  * 8/1992 Driscoll et al. ............. 395/700
5,276,821 A    1/1994 Imai et al.
5,317,743 A  * 5/1994 Imai et al. .................. 395/700

OTHER PUBLICATIONS

Scott A. Mahlke, et al., "A Comparison of Full and Partial Predicated Execution Support for ILP Processors," Proceedings of International Symposium of Computer Architecture, (1995), pp. 138–149.

John R. Ellis, The MIT Press, pp. 198–202, "Bulldog: A Compiler for VLIW Architectures", 1985.

* cited by examiner

Primary Examiner—Tuan Q. Dam
Assistant Examiner—Chuck Kendall
(74) Attorney, Agent, or Firm—Oblon, Spivak, McClelland, Maier & Neustadt, P.C.

(57) ABSTRACT

A compiling method, for compiling a source program into an object program for a CPU having multiple functional units that allow for concurrent operations and supporting predicated execution, for generating the object program that can be executed on the CPU at high speed by analyzing the source program and generating intermediate codes, making an analysis of the intermediate codes, generating, based on the analysis, an execution mode set instruction to set an execution mode managed within the CPU, allocating, based on the analysis, instructions such that whether they are to be executed or not to be executed depends on the execution mode set by the execution mode set instruction from the intermediate codes, wherein one or more instructions in which values in their respective specific fields are identical make an block together for every value in the specific field, finding, for each block, an ending part of the block in which its last instruction is allocated, and generating, when the ending part of a certain block is to be earlier in the object program than the ending part of another block, an unconditional branch instruction identical in specific field value to the instructions in the certain block, and allocating it either to be executed in the ending part of the certain block or to be executed as immediately as possible after the ending part of the block.

27 Claims, 17 Drawing Sheets

```
     cmp    Ri,Rj        nop                  nop            nop   (11-1)
     set    gt,1,2       nop                  nop            nop   (11-2)
L1:
     ldi(1) R1,_a        ldi(2)  Rk,-1        b(2)   L3      nop   (11-3)
     ldui(1) R1,_a       shti(1) R2,Ri,2      nop            nop   (11-4)
     ld(1)  Rk,R1,R2     nop                  nop            nop   (11-5)
L3:
```

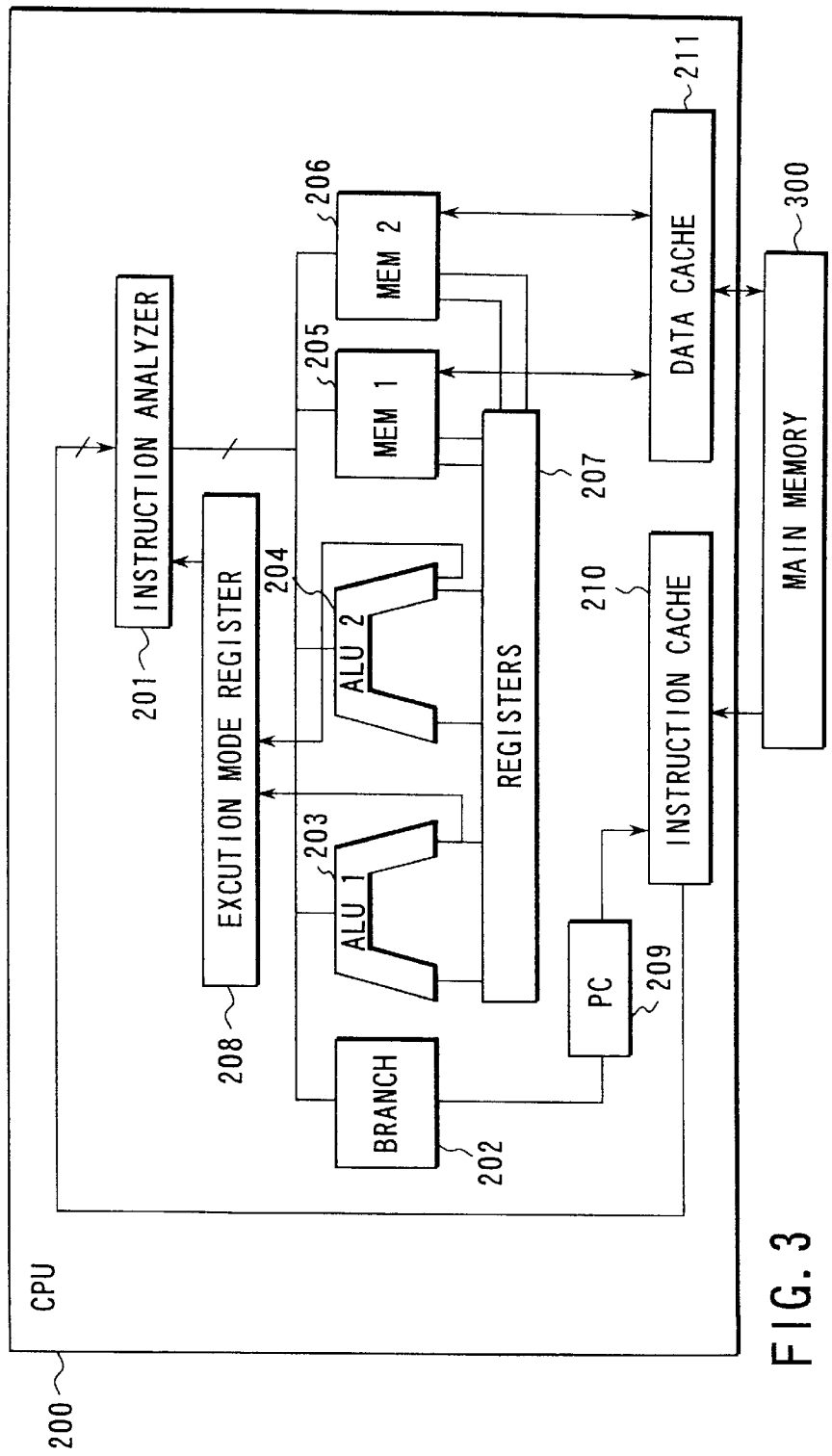

```
extern int a [100] ;              (5-1)
register int i,j,k ;              (5-2)
                                  (5-3)
if (i<j)                          (5-4)
  then                            (5-5)
     k=a [i] ;                    (5-6)
  else                            (5-7)
     k=-1 ;                       (5-8)
```

FIG. 7

```
(bb B0)                           (6-1)
(extern array 100 int "a" )       (6-2)
(register Rp1 int "i" )           (6-3)
(register Rp2 int "j" )           (6-4)
(register Rp3 int "k" )           (6-5)
(eb B0)                           (6-6)
(bb B1)                           (6-7)
(cmp Rp1 Rp2)                     (6-8)
(bc lse B3)                       (6-9)
(eb B1)                           (6-10)
(bb B2)                           (6-11)
(lda Rt1 a)                       (6-12)
(shti Rt2 Rp1 2)                  (6-13)
(ld Rp3 Rt1 Rt2)                  (6-14)
(b B4)                            (6-15)
(eb B2)                           (6-16)
(bb B3)                           (6-17)
(ldi Rp3 -1)                      (6-18)
(eb B3)                           (6-19)
(bb B4)                           (6-20)
```

FIG. 8

```
         cmp    Rp1,Rp2
         set    gt,1,2
L1:
         ldi(1)   Rt1,_a      nop       nop             (10-1)
         ldui(1)  Rt1,_a      nop       nop             (10-2)
         ld(1)    Rp3,Rt1,Rt2
                              ldi(2)    Rp3,-1    nop       (10-3)
                              shti(1)   Rt2,Rp1,2 b(2)  L3  (10-4)
                              nop                 nop       (10-5)
L3:
```

FIG. 12

```
         cmp    Ri,Rj
         set    gt,1,2
L1:
         ldi(1)   R1,_a       nop       nop             (11-1)
         ldui(1)  R1,_a       nop       nop             (11-2)
         ld(1)    Rk,R1,R2
                              ldi(2)    Rk,-1     nop       (11-3)
                              shti(1)   R2,Ri,2   b(2)  L3  (11-4)
                              nop                 nop       (11-5)
L3:
```

FIG. 13

```
         cmp    Ri,Rj
         set    gt,1,2
L1:
         shti(1)  R2,Ri,2     ldi       R1,_a     nop       (12-1)
         ld(1)    Rk,R1,R2    ldui      R1,_a     nop       (12-2)
                              ldi(2)    Rk,-1     b(2)  L3  (12-3)
                              nop                 nop       (12-4)
L3:
```

FIG. 15

```
COMPARE INSTRUCTION SEQUENCES, INSTRUCTIONS IN EACH
OF THE INSTRUCTION SEQUENCES BEING EQUAL TO EACH          ~ S31
OTHER IN THE VALUE IN THEIR PREDICATE FIELD

IN THE PRESENCE OF IDENTICAL ONE OR MORE INSTRUCTIONS,
TRANSLATE THEM INTO INSTRUCTION THAT IS EXECUTED          ~ S32
REGARDLESS OF EXECUTION MODE
```

FIG. 16

```
extern int a [100] ;           (13-1)
register int i,j,k ;           (13-2)
                               (13-3)
if(i<j)                        (13-4)
  then                         (13-5)
    k=a [i] ;                  (13-6)
  else                         (13-7)
    k=a [j] ;                  (13-8)
```

FIG. 17

| | | | |
|---|---|---|---|
| cmp | Ri, Rj | nop | nop |
| set | gt, 1, 2 | nop | nop |
| L1: | | | |
| ldi(2) | R1, _a | shti(2) | R2, Rj, 2 | nop | (14-1) |
| ldui(2) | R1, _a | ldi(1) | R1, _a | nop | (14-2) |
| ld(2) | Rk, R1, R2 | ldui(1) | R1, _a | nop | (14-3) |
| shti(1) | R2, Ri, 2 | nop | | nop | (14-4) |
| ld(1) | Rk, R1, R2 | nop | | b(2) L3 | (14-5) |
| | | | | nop | (14-6) |
| | | | | nop | (14-7) |
| L3: | | | |

FIG. 18

```
     cmp    Ri,Rj
     set    gt,1,2
L1:
     ldi    R1,_a        nop                       nop   (15-1)
     ldui   R1,_a        nop                       nop   (15-2)
     ld     Rk,R1,R2     shti(2)   R2,Rj,2   nop   (15-3)
L3:                      shti(1)   R2,Ri,2   nop   (15-4)
                         nop                       nop   (15-5)
```

FIG. 19

```
     cmp        Ri,Rj
     set        gt,1,2
L1:
     shti(1)    R2,Ri,2    ldi    R1,_a          nop   (21-1)
     ld         Rk,R1,R2   ldui   R1,_a          nop   (21-2)
L3:                        shti(2)   R2,Rj,2    nop   (21-3)
                           nop                   nop   (21-4)
```

FIG. 20

```
cmp      Ri,Rj                   nop              nop   (20-1)
set      gt,1,2                  nop              nop   (20-2)
L1:
ldi(2)   Rk,-1        b(1) L4    nop              nop   (20-3)
L3:
  . .
  . .
L4:
ldi(1)   R1,_a        shti(1) R2,Ri,2  nop        nop   (20-4)
ldui(1)  R1,_a        nop              nop        nop   (20-5)
ld(1)    Rk,R1,R2     b(1) L3          nop        nop   (20-6)
```

FIG. 22

```
START
  ↓
COMPARE EXECUTION RATES OF INSTRUCTION THAT IS EXECUTED
ONLY IN SPECIFIC MODE AND INSTRUCTION THAT IS EXECUTED       ~ S41
REGARDLESS OF EXECUTION MODE
  ↓
GENERATE THE LATTER WHEN IT IS HIGHER IN EXECUTION RATE      ~ S42
THAN THE FORMER
```

FIG. 23

```
extern int a [100],b [100] ;    (16-1)
register int i,j,k ;            (16-2)
                                (16-3)
if(i<j)                         (16-4)
  then                          (16-5)
    k=a [i] ;                   (16-6)
  else                          (16-7)
    k=b [j] ;                   (16-8)
```

```
    cmp     Ri,Rj                   nop     nop     (17-1)
    set     gt,1,2                  nop     nop     (17-2)
L1:
    ldi(2)  R1,_b        shti(2)  R2,Rj,2   nop     (17-3)
    ldui(2) R1,_b        ldi(1)   R1,_a     nop     (17-4)
    ld(2)   Rk,R1,R2     ldui(1)  R1,_a     b(2) L3 (17-5)
    shti(1) R2,Ri,2                nop      nop     (17-6)
    ld(1)   Rk,R1,R2               nop      nop     (17-7)
L3:
```

FIG. 26

```
    cmp    Ri,Rj                  nop     nop     (18-1)
    bc     lse,L2                 nop     nop     (18-2)
L1:
    ldi    R1,_a        shti  R2,Ri,2     nop     (18-3)
    ldui   R1,_a        nop               nop     (18-4)
    ld     Rk,R1,R2     b     L3          nop     (18-5)
L2:
    ldi    R1,_b        shti  R2,Rj,2     nop     (18-6)
    ldui   R1,_b        nop               nop     (18-7)
    ld     Rk,R1,R2     nop               nop     (18-8)
L3:
```

COMPILING METHOD AND MEMORY STORING THE PROGRAM CODE

BACKGROUND OF THE INVENTION

The present invention relates to an compiling method for compiling a source program into an object program for a CPUs that support predicated execution.

Programs executed on computers generally contain a large number of conditional branch instructions. A conditional branch instruction is one which changes the address of an instruction to be executed next, depending on whether a given condition is true or false. Usually, in the conditional branch instructions, the state where the condition is true is referred to as "the branch is taken". In this case, an instruction to be executed after the conditional branch instruction is the instruction in an address which is specified by the operand in that conditional branch instruction, as opposed to the instruction in the address following that of the conditional branch instruction. On the other hand, the state where the condition is false is referred to as "the branch is not taken". In this case, the instruction to be executed after the conditional branch instruction is the one in the address following that of the conditional branch instruction.

In CPUs that perform pipeline processing, an instruction is fetched from a memory or cache into the CPU several clock cycles before it is executed. Thus, the fetching of an instruction which has turned out to should be executed after the execution of a conditional branch instruction after a decision of whether its condition is true or not was made results in a failure to execute the next instruction in the cycle following the conditional branch instruction cycle. In that case, an idle cycle will be generated in which nothing can be performed. Such an event is referred to as a pipeline hazard, which is one of obstacles to high-speed program execution.

As one of methods to circumvent the pipeline hazard, predicated execution has been proposed (reference 1; "A Comparison of Full and Partial Predicated Execution Support for ILP Processors", by Scott Mahlke, Proc. Of ISCA '95, pp. 138–149).

CPUs that support predicated execution differ from usual CPUs (i.e., CPUs that do not support predicated execution) in the following two points.

There is a predicate mode the CPU controls and a predicate mode set instruction is supported.

An opcode has a predicate field. The instruction is executed only when a coincidence occurs between the mode indicated by a value described in the predicate field and the predicate mode controlled by the CPU.

The utilization of the predicated execution allows conditional branch instructions in usual CPUs and instructions executed depending on whether their conditions are met to be modified as follows:

An conditional branch instruction is changed to an execution mode set instruction, which sets the CPU mode to "a" when the condition is true and to "b" when the condition is false.

With a sequence or group of instructions "A" to be executed when the branch is taken (i.e., when the condition is true), their respective predicate field value is specified to be a. With a sequence or group of instructions "B" to be executed when the branch is not taken (i.e., when the condition is false), their respective predicate field value is specified to be b. These instructions are allocated after the execution mode set instruction. An instruction in which the predicate field value is "a" and an instruction in which the predicate field value is "b" may be mixed. The "a" and "b" each take some numerical values.

The pipeline hazard can be circumvented by the utilization of the predicated execution because conditional branch instructions can be removed from a program.

Such predicated execution is expected to provide greater benefits especially in CPUs having VLIW (Very Long Instruction Word) architecture. Here, VLIW refers to an architecture in which a CPU contains multiple functional units which operate concurrently (reference 1: "A Compiler for VLIW Architectures" by Ellis, J. R., Bulldog, The MIT Press). The VLIW, which has the capability to execute two or more instructions at the same time, permits the speed of execution of a program to be increased, provided that instructions can be allocated simultaneously to many functional units. With the predicated execution, it is easy for many functional units to be filled with instructions because, as described previously, instructions can be allocated from both a sequence or group of instructions "A" which are executed when the branch is taken and a sequence or group of instructions "B" which are executed when the branch is not taken. For the VLIW in particular, therefore, the predicated execution is a promising means for speeding up the execution of a program.

However, the degree to which the program execution speed is increased depends on how to allocate the sequence of instructions "A" and the sequence of instructions "B" to the functional units. The establishment of a compiling method which allows for higher program execution speed is a problem.

As described above, the predicated execution does not suffer the pipeline hazard because no conditional branch is performed and the possibility therefore exists that a program may be executed at high speed. However, there exists heretofore no compiling method which allows for program execution at higher speed.

BRIEF SUMMARY OF THE INVENTION

It is therefor an object of the present invention to provide a compiling method which permits a CPU adapted for predicated execution to execute a program at high speed.

The invention is intended for a compiling method for compiling a source program into an object program for a CPU having multiple functional units that allow for concurrent operations and having a function of executing an instruction only when there is a predetermined relationship between an execution mode indicated by a value in a specific field in an instruction code and an execution mode managed within the CPU.

According to a first aspect of the present invention there is provided a compiling method comprising the steps of: analyzing the source program and generating intermediate codes; making an analysis of the intermediate codes; and allocating instructions from the intermediate codes based on the analysis, wherein an execution mode setting instruction to set an execution mode managed within the CPU, is allocated, instructions, such that whether the instructions are to be executed or not to be executed depends on the execution mode set by the execution mode setting instruction, are allocated, the instructions, in which values in their respective specific fields are identical, make an block together for every value in the specific field; an ending part of the block in which its last instruction is allocated is found for each block; and when the ending part of a certain block is to be earlier in the object program than the ending part of another block, an unconditional branch instruction identical in specific field value to the instructions in the certain block, is allocated either to be executed in the ending part of the certain block or to be executed as immediately as possible after the ending part of the block; whereby the object program is generated from the allocated instructions.

According to a second aspect of the present invention there is provided a compiling method comprising the steps of: analyzing the source program and generating intermediate codes; making an analysis of the intermediate codes; and allocating instructions from the intermediate codes based on the analysis, wherein an execution mode setting instruction to set an execution mode managed within the CPU, is allocated, instructions such that whether the instructions are to be executed or not to be executed depends on the execution mode set by the execution mode setting instruction are allocated, and wherein a decision of whether an instruction that is executed only when an execution mode set by the execution mode setting instruction is a certain specific mode can be allocated so that the instruction may be executed before the execution mode setting instruction or not is affirmative, the instruction is translated into an instruction which is executed regardless of the execution mode and the instruction is allocated to be executed before the execution mode setting instruction; whereby the object program is generated from the allocated instructions.

According to a third aspect of the present invention there is provided a compiling method comprising the steps of: analyzing the source program and generating intermediate codes; making an analysis of the intermediate codes; allocating instruction from the intermediate codes based on the analysis, wherein an execution mode setting instruction to set an execution mode managed within the CPU, is allocated, instructions, such that whether they are to be executed or not to be executed depends on the execution mode set by the execution mode setting instruction are allocated, the instructions, in which values in their respective specific fields are identical, make an block together for every value in the specific field, blocks each other are compared for their contents, and when it is found that an equivalent instruction is present in all the block, the instruction is translated into an instruction that is executed regardless of the execution mode; whereby the object program is generated from the allocated instructions.

According to a fourth aspect of the present invention there is provided a compiling method comprising the steps of: analyzing the source program and generating intermediate codes;

making an analysis of the intermediate codes;
  allocating instructions from the intermediate codes based on the analysis, wherein an execution mode setting instruction to set an execution mode managed within the CPU, is allocated, an execution mode which is high in execution count is identified, an instruction corresponding to the execution mode identified to be high in execution count is allocated so that the instruction is executed without branching from the execution mode setting instruction and an instruction corresponding to the other execution mode is allocated so that the instruction is executed with branching from the execution mode setting instruction, from the intermediate codes; whereby the object program is generated from the allocated instructions.

In this case, it is recommended that the instruction corresponding to the other execution mode be allocated to a location to which a branch is caused, and an unconditional branch instruction to make a jump to the beginning of an instruction that follows the final instruction corresponding to the execution mode identified to be high in execution count be allocated at the ending location of the instruction corresponding to the other execution mode.

According to a fifth aspect of the present invention there is provided a compiling method comprising the steps of: analyzing the source program and generating intermediate codes; making an analysis of the intermediate codes; allocating instructions from the intermediate codes based on the analysis, wherein an execution speed at which, when instructions are allocated to be executed only in their respective specific execution mode, the CPU would execute the instructions is compared with an execution speed at which, when instructions are allocated to be executed regardless of the execution mode, the CPU would execute the instructions; and where the comparison shows that the execution speed for the instructions to be executed regardless of the execution mode is higher than for the instructions to be executed only in their respective specific execution mode, instructions to be executed are allocated regardless of the execution mode from the intermediate codes; whereby the object program is generated from the allocated instructions.

Each of the methods described above may further comprises the steps of identifying an execution mode which, of execution modes, is high in execution count, and allocating an instruction in the block corresponding to the execution mode of high execution count, to be executed earlier in the object program on a preferential basis.

Each of the methods described above may be implemented such that, even if execution mode-dependent execution becomes unnecessary, no instruction to reset the execution mode to an initial state is allocated.

In each of the methods, the execution mode set instruction is set an execution mode according to whether the branch condition is true or not. The predetermined relationship is such that, when the value in a specific field in an instruction code is equal to a predetermined specific value, the corresponding instruction is executed regardless of execution modes managed within the CPU, otherwise the instruction is executed only when a coincidence occurs between the execution mode indicated by the value in the specific field and an execution mode managed within the CPU.

In the method according to the first aspect of the invention, since an unconditional branch instruction is appropriately generated and allocated, it becomes possible to prevent an idle cycle or cycles from being executed. Thus, an object program can be run at high speed on a CPU that performs predicated execution. In other words, a high-speed executable object program can be generated.

In the method according to the second aspect of the invention, since a possible instruction can be allocated prior to the execution mode set instruction, the number of program cycles can be reduced. Thus, a object program can be run at high speed oh a CPU that performs predicate execution. In other words, a high-speed executable object program can be generated.

In the method according to the third aspect of the invention, since instructions common to blocks or instruction sequences are changed into a single instruction that is executed regardless of the execution mode, the number of instructions that make up a object program and the number of program cycles can be reduced. Thus, the object program can be run at high speed on a CPU that performs predicate execution. In other words, a high-speed executable object program can be generated.

In the method according to the fourth aspect of the invention, since an instruction of high execution count can be executed without branching. Thus, an object program can be run at high speed on a CPU that performs predicate execution. In other words, a high-speed executable object program can be generated.

In the method according to the fifth aspect of the present invention, instructions can be allocated in accordance with a method by which high execution speed can be expected. Thus, an object program can be run at high speed on a CPU that performs predicate execution. In other words, a high-speed executable object program can be generated.

Further, the invention may also be implemented in the form of a memory storing computer-executable program code. For example, a memory storing computer-executable program code, which corresponds to the compiling method according to the first aspect of the invention, comprising: means for causing a computer to analyze the source program and generate intermediate codes; means for causing a computer to make an analysis of the intermediate codes; means for causing a computer to allocate instructions from the intermediate codes based on the analysis, wherein an execution mode setting instruction to set an execution mode managed within the CPU, is allocated, instructions, such that whether the instructions are to be executed or not to be executed depends on the execution mode set by the execution mode setting instruction, are allocated, the instructions, in which values in their respective specific fields are identical, make a block together for every value in the specific field, an ending part of the block in which its last instruction is allocated is found for each block; and when the ending part of a certain block is to be earlier in the object program than the ending part of another block, an unconditional branch instruction identical in specific field value to the instructions in the certain block, is allocated either to be executed in the ending part of the certain block or to be executed as immediately as possible after the ending part of the block; whereby the object program is generated from the allocated instructions.

Likewise, the compiling methods according to the second to fifth aspects of the invention may be implemented in the form of a memory storing computer-executable program code.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows an example of an instruction format;

FIG. 3 shows an arrangement of a target CPU of the compiler for instruction allocation;

FIG. 7 shows an example of a source program;

FIG. 8 shows examples of intermediate codes;

FIG. 12 shows an example of a program generated by the code allocator in FIG. 1;

FIG. 13 shows an example of a program generated by the register allocator in FIG. 1;

FIG. 15 shows an example of a program generated;

FIG. 16 is a flowchart illustrating an instruction allocation procedure;

FIG. 17 shows an example of a source program;

FIG. 18 shows an example of a source program generated;

FIG. 19 shows an example of a source program generated;

FIG. 20 shows an example of a source program generated;

FIG. 22 shows an example of a program generated by the register allocator in FIG. 1;

FIG. 23 is a flowchart illustrating an instruction allocation procedure;

FIG. 24 shows an example of a source program;

FIG. 25 shows an example of a program generated by the register allocator in FIG. 1;

FIG. 26 shows an example of a program generated by the register allocator in FIG. 1.

DETAILED DESCRIPTION OF THE INVENTION

Figure 1:
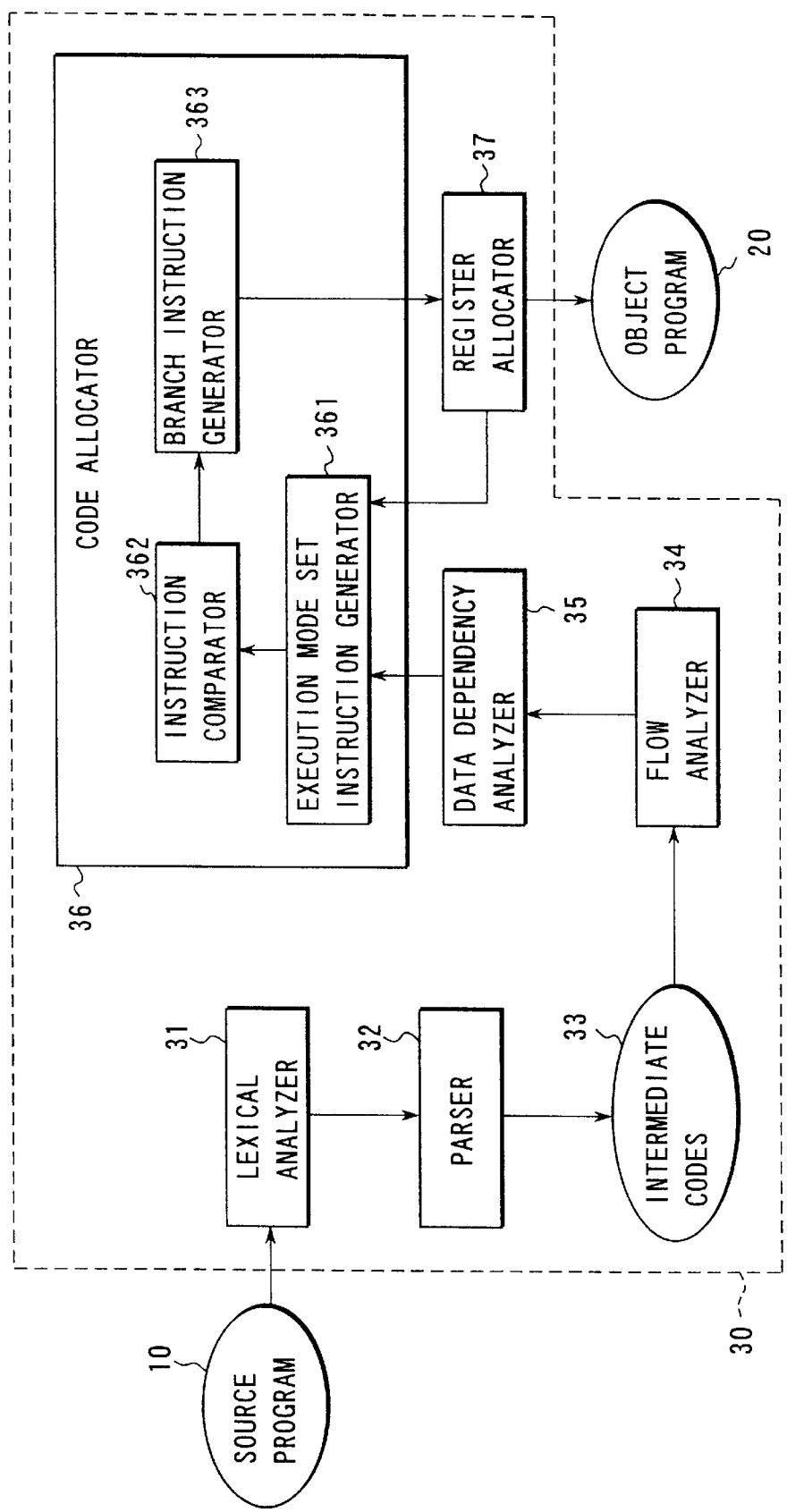
FIG. 1 is a schematic representation of a compiler according to an embodiment of the present invention.

FIG. 1 shows a configuration of a compiler according to a first embodiment of the present invention.

As shown in FIG. 1, the compiler 30 receives a source program 10 described in a high-level language, performs allocation of instructions, and generates an object program 20 executable by a target CPU or computer.

The compiler 30 includes a lexical analyzer 31, a parser 32, a flow analyzer 34, a data dependency analyzer 35, a code allocator 36, and a register allocator 37.

The compiler 30 can also be implemented in software. In this case, the sections 31, 32, 34, 35, 36, and 37 may be taken to be software modules.

The lexical analyzer 31 analyzes a stream of characters that makes up the input source program and breaks it into terms.

The parser 32 checks the terms resulting from the lexical analysis to see if they obey the rules of the syntax of the high-level language and, in the event of a syntax error, stops the execution with notification. If the terms follow the syntax, then intermediate codes 33 are produced from the results of the parsing. The resulting intermediate codes are stored into main memory or a storage device such as a disk.

The intermediate codes 33 are usually managed inside the compiler and are not accessible by the outside world.

When the intermediate codes have been produced, the flow analyzer 34 analyzes the flow of the program on the basis of the intermediate codes.

When the analysis of the program flow has been done, the data dependency analyzer 35 makes a data dependency analysis of each of element parts that make up the intermediate codes and reveals constraints that in what order the instruction allocation must be performed.

The code allocator 36, while being described later in more detail, produces codes (the object program equivalent allocated pseudo resisters) just short of the object program on the basis of the intermediate codes. Here, in the first embodiment, the code allocator 36 contains an execution mode set instruction generator 361 that generates an execution mode set instruction, an instruction comparator 362 that generates a sequence of instructions for each execution mode to be set and compares the last instruction cycle, and a branch instruction generator 363 that generates an unconditional branch instruction to be executed in a certain execution mode on the basis of the result of the comparison.

The register allocator 37 performs such register allocation that real registers of the target CPU are reallocated to the codes just short of the object program which have been generated by the code allocator 36 and have been provisionally allocated pseudo registers by that code allocator, thereby completing the object program.

As shown in FIG. 2, an instruction comprises an "opcode" field, an "operand1" field, an "operand2" field, an "operand3" field, and a "predicate" field.

The opcode represents the type of the instruction. The opcode is allocated several bits and its value defines the instruction type.

The operand1, operand2 and operand3 are a first operand, a second operand, and a third operand, respectively. The operand indicates a register number or an immediate value. Not every opcode has three operands and the number of operands is determined by the opcode value. Whether each operand indicates a register number or an immediate value depends also on the opcode value. The number of bits occupied by each operand is also determined by the opcode value.

The predicate field is a field that represents an execution mode in which the particular instruction is to be executed. The predicate field consists of several bits. When all the bits in the predicate field are zeros, the particular instruction is executed regardless of the execution mode. If there is a nonzero bit in the predicate field, the particular instruction is executed only when a coincidence occurs between the value in that field and the value in an execution mode register managed by the CPU.

FIG. 3 shows a configuration of a CPU that is. a target for instruction allocation by the compiler (i.e., a CPU that supports the predicate execution).

In FIG. 3, 200 denotes a CPU. In this CPU are incorporated an instruction analyzer 201, a branch unit 202, a first integer unit 203, a second integer unit 204, a first memory access unit 205, a second memory access unit 206, a set of registers 207, an execution mode register 208, a program counter 209, an instruction cache 210, and a data cache 211. To the CPU 200 a main memory 300 is externally connected.

The object program is loaded into the main memory 300 and then executed by the CPU 200.

The CPU 200 takes the VLSI form. That is, the CPU has one branch unit 202, two integer units 203 and 204, and two memory access units 205 and 206, and these functional units 202 through 206 are simultaneously operable.

The CPU 200 fetches instructions in addresses indicated by the program counter 209 from the cache 210. If the instructions in those addresses are nonexistent in the cache 210, then they are transferred from the main memory 300 to the cache 210. Four instructions are issued at one time in each cycle from the cache 210 to the instruction analyzer 201.

The CPU 200, while having five functional units 202 through 206, can issue four instructions at one time.

The instruction analyzer 201 decodes each of the four instructions and sees their respective opcodes to determine which of the functional units is to be used to execute each instruction. When the instruction predicate field contains a nonzero bit, the instruction analyzer 201 reads the execution mode register 208 and determines the execution of that instruction if the predicate field value coincides with the execution mode register value.

Each of the functional units 202 through 206, when an instruction is issued to it, processes the instruction. In executing an instruction, each functional unit makes access to the set of registers 207 and the data cache 211 as required. When the execution mode set instruction is executed in either of the integer units 203 and 204, the value in the execution mode register 208 is updated.

Next, reference will be made to FIGS. 4, 5 and 6 to describe the instruction allocation for the CPU that supports the predicated execution under comparison with instruction allocation for a CPU that does not support the predicated execution.

Figure 4:
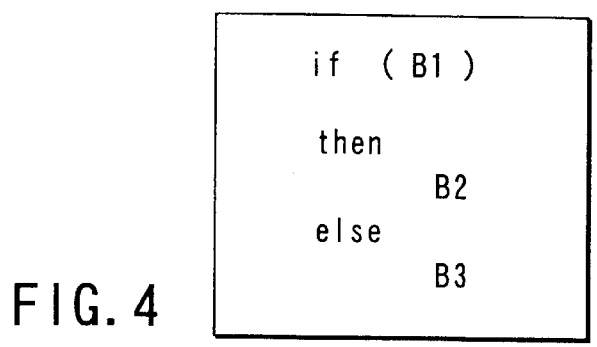
FIG. 4 shows an example of a source program.

In FIG. 4 there is illustrated a simple source program containing a conditional branch instruction. This source program examines whether a condition indicated by B1 is true or false and executes an instruction sequence B2 if the condition is true, otherwise an instruction sequence B3 is executed.

Figure 5:
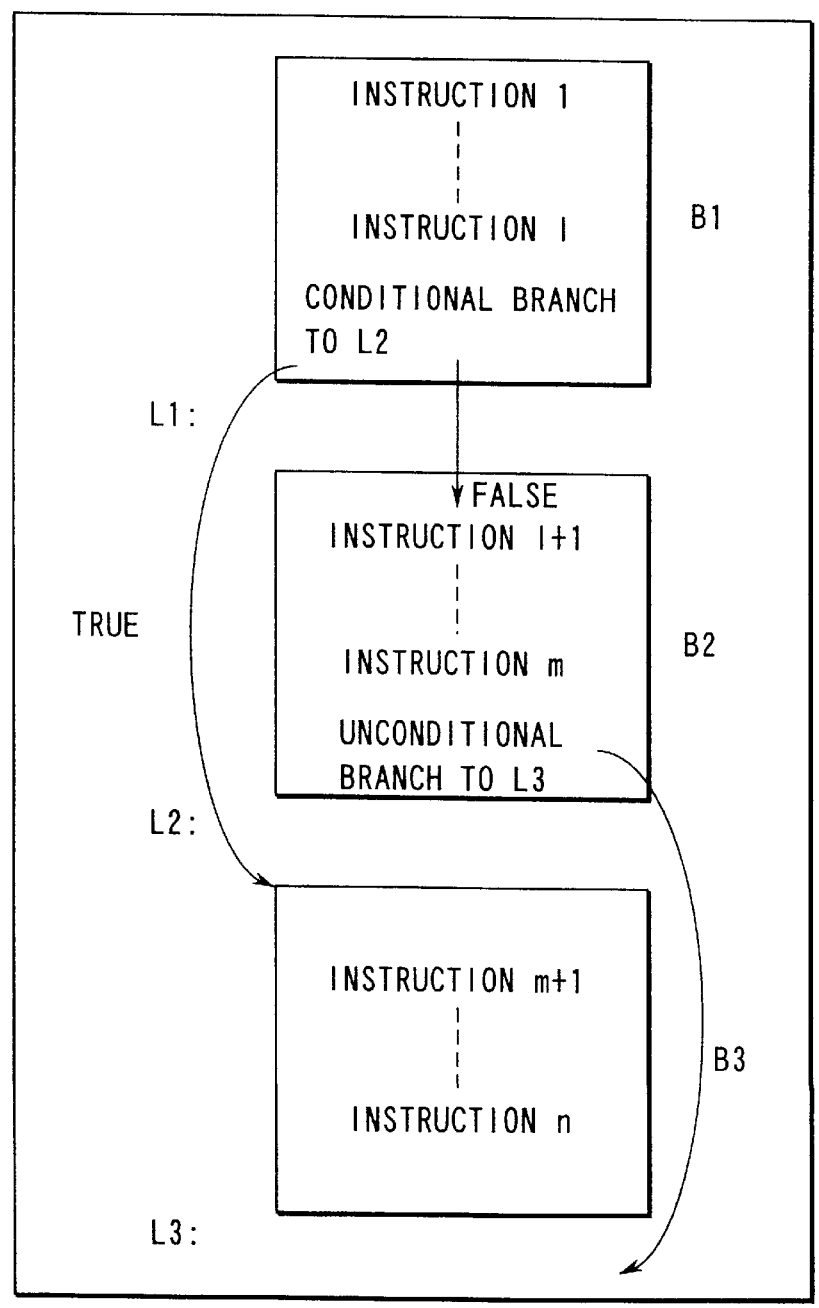
FIG. 5 shows an example of instruction allocation for a CPU that does not support the predicated execution.

FIG. 5 shows an example of instruction generation based on a conventional instruction allocation method. In this example, a set of instructions corresponding to B1 is first generated and a set of instructions corresponding to B2 is generated next. Finally, a set of instructions B3 is generated.

A conditional branch instruction is generated at the end of the instruction sequence B1. However, the condition in the source program is opposite in the result of decision to the condition at the generated instruction level. That is, in FIG. 5, if the condition is true, then a branch is taken to jump to label L2, so that the instruction sequence corresponding to B2 is executed. Otherwise, no branch is taken, resulting in the instruction sequence corresponding to B2 being executed.

At the end of the instruction sequence B2, unconditional branch instruction to skip the instruction sequence B3 is generated.

Figure 6:
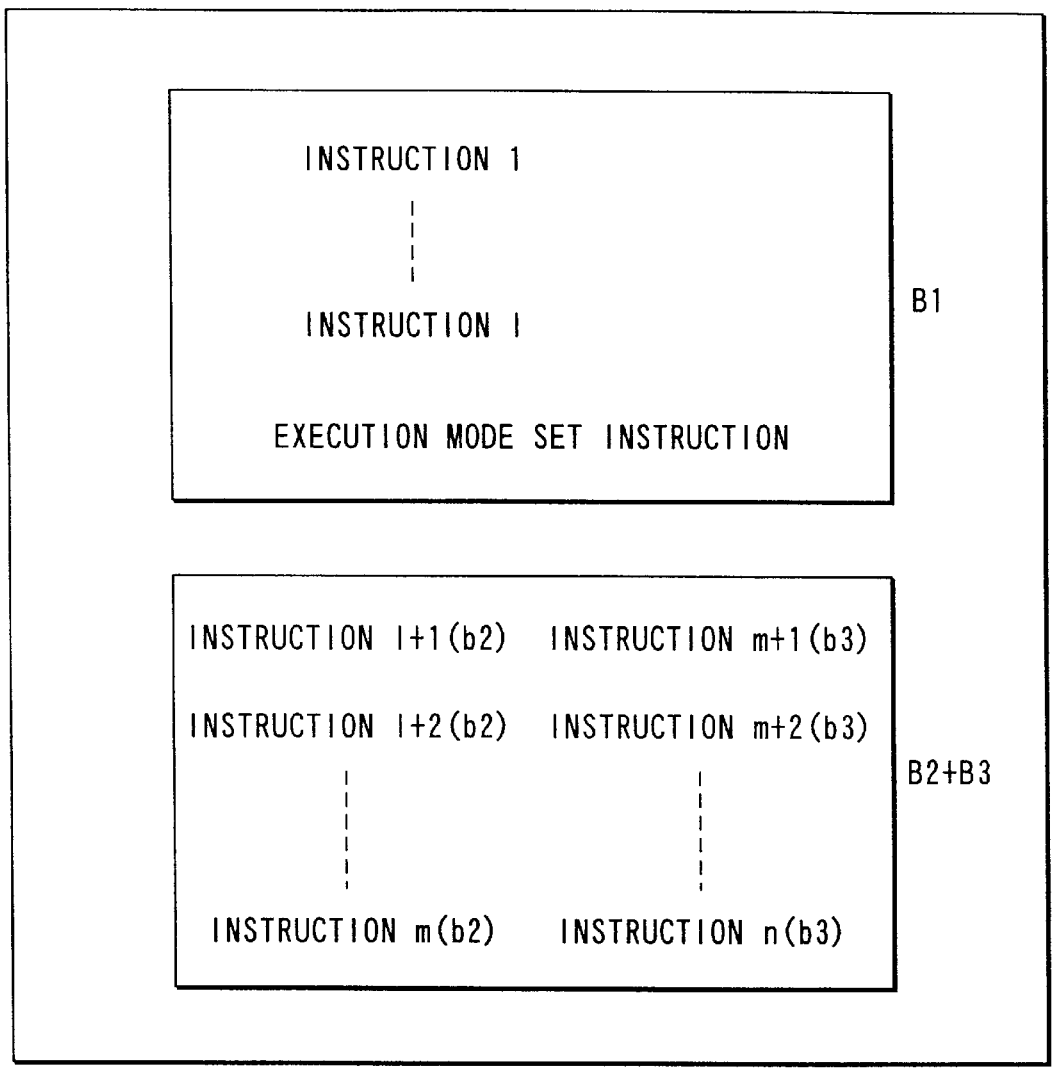
FIG. 6 shows an example of instruction allocation for a CPU that supports the predicated execution.

FIG. 6 shows an example of instruction generation by the instruction allocation method according to this embodiment.

First, a sequence of instructions corresponding to B1 is generated. However, unlike the case of FIG. 5, no conditional branch instruction is generated at the end of the instruction sequence B1. Instead, an execution mode set instruction is generated at the end of the instruction sequence B1. This execution mode set instruction is one to set an execution mode corresponding to the result of the decision of whether the condition is true or false in the execution mode register 208 in FIG. 3. In this example, the execution mode set instruction is such that, if the condition corresponding to B1 in the source program is true, then the execution mode b2 is set, otherwise the execution mode b3 is set. Here, b2 and b3 each are a nonzero value equal in the number of bits to the instruction predicate field. The value for b2 and the value for b3 are different from each other.

Next, an instruction sequence corresponding to B2 and an instruction sequence corresponding to B3 are generated. Unlike the case of FIG. 5, an instruction sequence corresponding to B2 and an instruction sequence corresponding to B3 may be mixed. b2 is described in the predicate field of each instruction corresponding to B2, while b3 is described in the predicate field of each instruction for B3.

As described previously, when the instruction predicate field is not zero, the predicated execution supporting CPU reads the execution mode register and executes only instructions for which the comparison with the register value indicates equality. Thus, if the condition is true, then b2 is set in the execution mode register, so that instructions corresponding to B2 and having b2 in the predicate field are executed. If, on the other hand, the condition is false, then b3 is set in the execution mode register, which allows instructions corresponding to B3 and having b3 in the predicate field to be executed.

The compiler of this embodiment will be described below in more detail.

FIG. 7 shows a more detailed source program. This source is such that, if the condition i<j is true, the array a[i] value is substituted into k, otherwise −1 is substituted into k. B1 in FIG. 4 corresponds to the (5-7) line in FIG. 7, B2 to the (5-6), and B3 to the (5-8) line.

When the source program is entered into the compiler, the intermediate codes are generated by the workings of the lexical analyzer 31 and the parser 32.

FIG. 8 shows examples of intermediate codes generated from the source program of FIG. 7. A intermediate code unit is called a node. In the case of FIG. 8, (6-1) to (6-20) each form a node.

The rows (5–x) of the source program of FIG. 7 are made to correspond with the nodes (6–y) of the intermediate codes of FIG. 8 as follows:

(5-1)→(6-2)
(5-2)→(6-3), (6-4), (6-5)
(5-4)→(6-7), (6-8), (6-9), (6-10)
(5-5)→(6-11)
(5-6)→(6-12), (6-13), (6-14), (6-15), (6-16)
(5-7)→(6-17)
(5-8)→(6-18), (6-19)

Here, description is given of nodes which, of the nodes of FIG. 8, have no correspondence with any row of FIG. 7. The node (6-1) of FIG. 8 is one that indicates the beginning of a block 0 (B0) and (6-6) is one that indicates the ending of the block 0 (B0). The node (6-20) is a block that follows the row (5-8). The blocks are used in the subsequent flow analysis process.

The node (6-8) is an instruction to compute Rp2–Rp1 and to set a condition code according to the computation result. The node (6-9) is an instruction to jump to B3 if the condition code value is less than or equal. That is, if Rp2–Rp1 is less than or equal to 0, then a jump is made to B3.

Subsequent to the generation of the intermediate codes, the flow analyzer 34 analyzes the flow of blocks on the basis of the intermediate codes.

Figure 9:
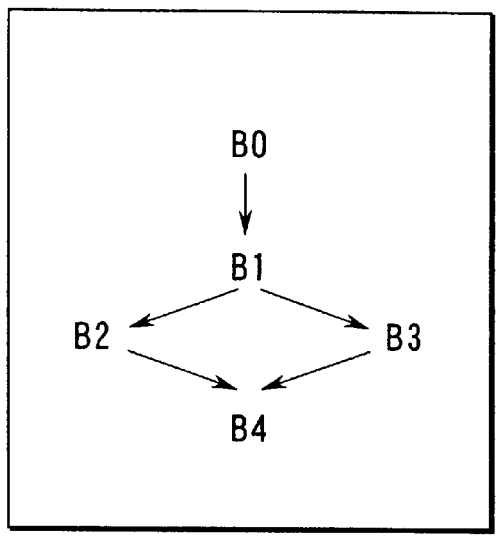
FIG. 9 shows examples of analyses by the flow analyzer in FIG. 1.

FIG. 9 shows the analyses of the intermediate codes of FIG. 8 by the flow analyzer 34. From this it is seen that the intermediate code flow begins at block Bo, is followed by block B1, branches out into blocks B2 and B3, and ends in block B4.

Subsequently, the data dependency analyzer 35 analyzes the data dependency relationship to make clear the context of the intermediate code nodes. The data dependency analysis is made on only nodes that are actually related to instruction generation.

In this embodiment, the code allocator 36 performs on the principle that instructions within the same block are allocated for the same block. Thus, the data dependency analyzer 35 makes an analysis of data dependency only within each block.

Figure 10:
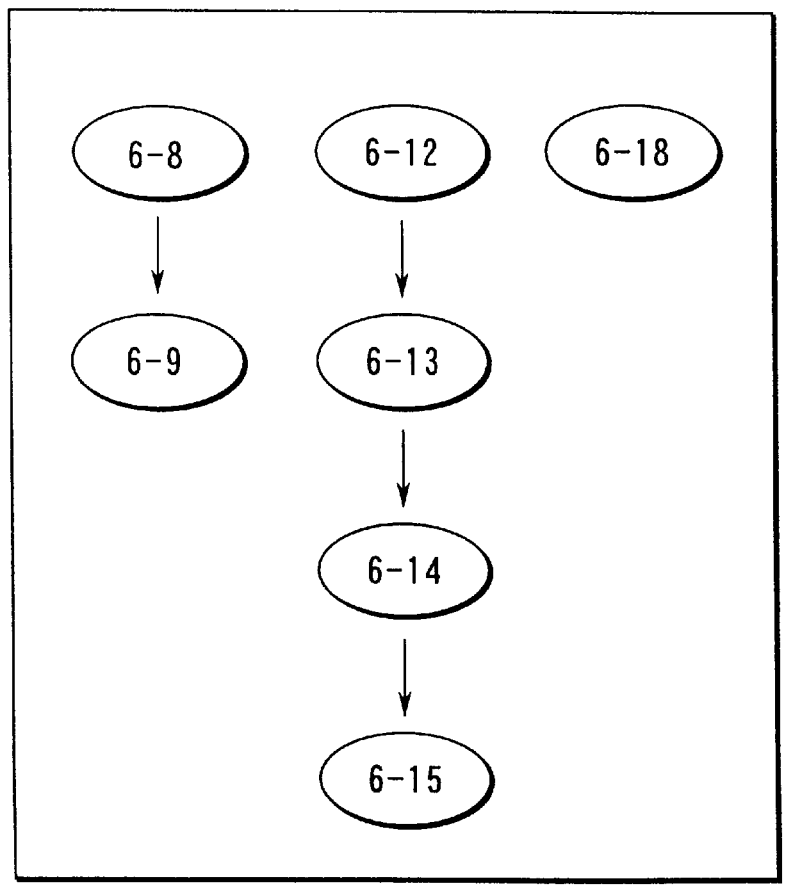
FIG. 10 shows examples of analyses by the data dependency analyzer in FIG. 1.

FIG. 10 shows the analyses of the intermediate codes of FIG. 8 by the data dependency analyzer 35. In this example, node X→node Y indicates that node X must be executed prior to node Y. For example, node (6-8) must be executed prior to node (6-9).

Next, the instruction allocation procedure in the code allocator 36 will be described.

Figure 11:
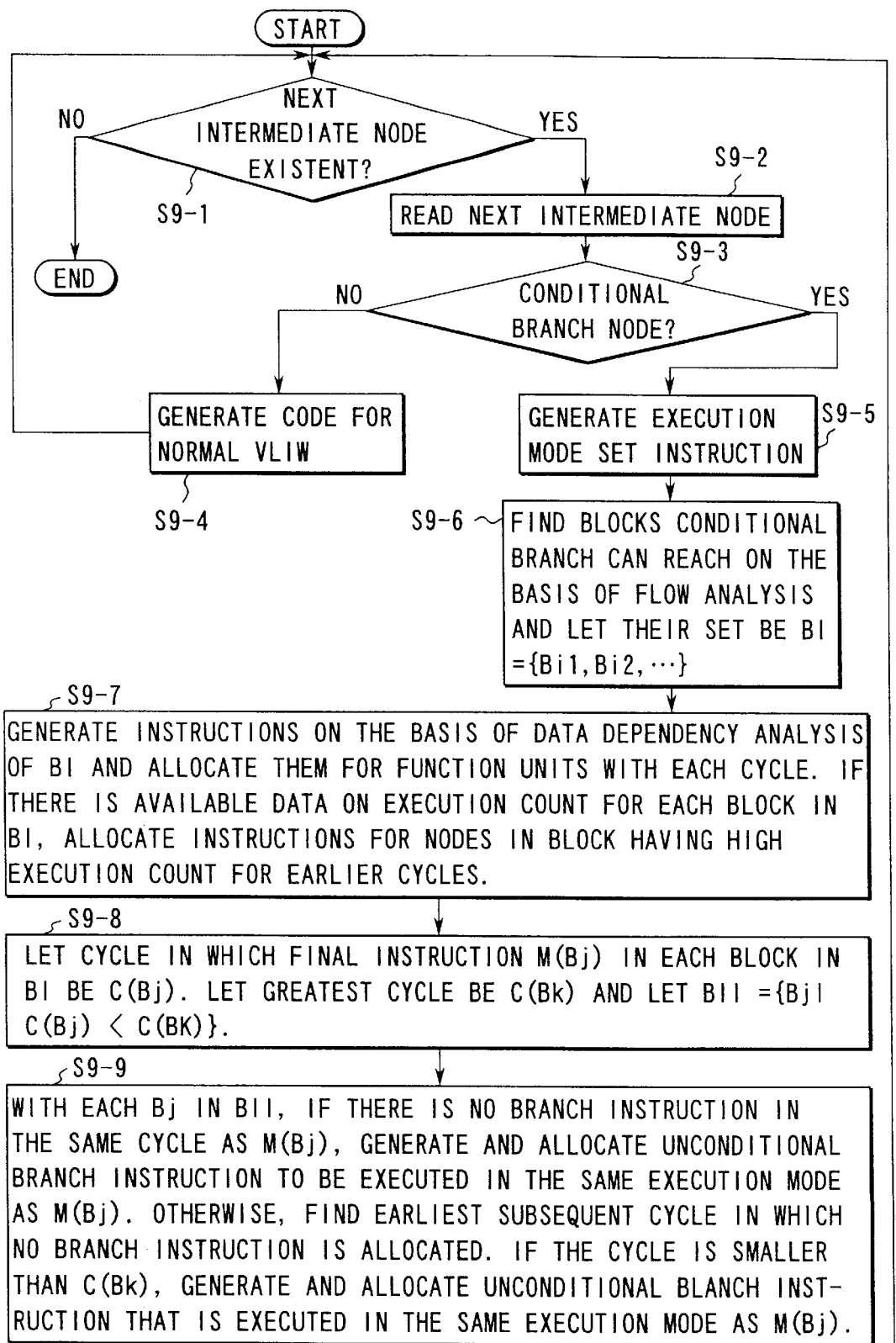
FIG. 11 is a flowchart illustrating an instruction allocation procedure.

FIG. 11 shows an instruction allocation processing algorithm of this embodiment. FIG. 12 shows codes generated as a result of application of the algorithm of FIG. 11 to the intermediate codes of FIG. 8. In the example of FIG. 12, four instructions arranged from left to right (for example, cmp and three nops on the first row) are simultaneously fetched from the instruction cache 210 into the instruction analyzer 201 in each cycle. Each of the four instructions is then allocated to any one of the five functional units 202 to 206 by the instruction analyzer 201. The cycles are represented by (10-1) to (10-5). The two instructions, ldi and ldui, of FIG. 12 correspond to lda of FIG. 8 (ldi is an instruction to load low-order bits and ldui is an instruction to load high-order bits).

In the procedure of FIG. 11, first, as long as there is any intermediate node left unprocessed the next intermediate node is read in and a decision is then made as to whether the read intermediate code is a conditional branch node (steps S9-1 and S9-2).

If it is not, then an instruction is generated in the same manner as conventional (steps S9-3 and S9-4). For example, it is recommended that an instruction be generated in accordance with the method disclosed in the aforementioned reference 2 (pp. 198–202).

If the intermediate node is a conditional branch node ((6-9) in FIG. 8), then the following procedure is carried out.

First, an execution mode set instruction is generated (step S9-5).

In FIG. 12, "set gt, 1, 2" in (10-2) corresponds to the execution mode set instruction. The "set", a mnemonic for opcode, is an instruction to set in the execution mode register a value dependent on whether the condition is true or false. The "gt" is a mnemonic for "greater than". The two values following "gt" respectively indicate a value to be set when the condition is true and a value to be set when the condition is false. Thus, it follows that "set gt, 1, 2" is an instruction to set 1 in the execution mode register when "greater than", the condition at the point of execution, is true or to set 2 when the condition is false.

In this example, since Rp2–Rp1 is computed in accordance with the instruction "cmp Rp1, Rp2" in (10-1) and a condition code is set according to the result, 1 is set in the execution mode register if Rp2–Rp1 is greater than 0, otherwise 2 is set.

When 1 has been set in the execution mode register, only instructions whose predicate field 1 or 0 are executed as long as the register value is not changed. On the other hand, when 2 has been set in the execution mode register, only instructions whose predicate field 2 or 0 are executed as long as the register value is not changed. It is supposed herein that instructions whose predicate field is 0 are always executed regardless of the value in the execution mode register.

Next, in step S9-6, on the basis of the analyses of the flow blocks B are sought which can be reached by the conditional branch. Let their set be BI={$B_{i1}$, $B_{i2}$, . . . }. In the example of FIG. 9, BI={B2, B3}

Next, in step S9-7, instruction allocation is made for the functional units 202 to 206 with each cycle so as to retain the data dependency relationship as shown in FIG. 10. The allocation is repeated until all the intermediate codes in the blocks in the set BI are. exhausted. When there is available data on execution count for each block in BI, it is desirable to allocate on or more instructions for nodes in a block having a greater execution count to one or more earlier cycles on a preferential basis. Here, an earlier cycle is a cycle whose allocation is earlier in a flow of a program.

In FIG. 12, the instructions in B3 are allocated on a preferential basis. That is, "ldi(2) Rt3,–1" is allocated to the first cycle (10-3). (2) that follows Idi indicates that the predicate field value is 2.

In this embodiment, it is supposed that the instructions contained in B2 are generated with the predicate field as 1 and the instructions in B3 are generated with the predicate field as 2.

Next, in step 69-8, the cycle $C(B_j)$ allocated the final instruction $M(B_j)$ in each block in BI is found. A cycle comparison is then made to find the cycle that is not the latest one C(Bk). Let there set be BII={$B_j$|$C(B_j)$<C(Bk)}.

In the example of FIG. 12, the cycles each allocated the final instruction in a respective one of the blocks are (10-3) and (10-5); thus, the cycle that is not final is (10-3).

Next, in step 59-9, with each $B_j$ in BII, for the cycle $C(B_j)$ that is not the latest one C(Bk) an unconditional branch instruction to be executed in the same execution mode as $M(B_j)$ is generated and allocated. This is because the execution of idle cycles until all the instructions in BI have been executed results in failure to increase the processing speed.

In the example of FIG. 12, the sequence of instructions in which the predicate field is 2 terminates in (10-3), while the sequence of instructions in which the predicate field is 1 terminates in (10-5). That is, the cycle in which the last instruction "ldi(2) Rp3,–1" of the former instruction fig sequence of instructions (B3) is to be executed is earlier than the cycle in which the last instruction "ldi(1) Rp3,Rt1,Rt2" of the latter instruction sequence of instruction(b2).

When the execution mode is 2, the execution of (10-4) and (10-5) results in waste of two cycles. For this reason, in (10-3) "b(2) L3" is allocated, which is an unconditional branch instruction that is executed only when the execution mode is 2. Thereby, the processing speed is improved by one cycle when the execution mode is 2.

In this embodiment, only one branch instruction can be executed in the same cycle. If, therefore, another branch instruction is present in (10-3), then a search is made of the earliest subsequent cycle in which no branch instruction is present. If the found cycle is prior to the final instruction in BI, an unconditional branch instruction that is executed in the execution mode 2 needs merely to be generated and allocated in that cycle.

In this manner, the codes as shown in FIG. 12 are generated. At this point of time, the instructions are allocated pseudo registers.

When the instruction allocation by the code allocator 36 terminates, the register allocation is performed by the register allocator 37.

FIG. 13 shows an object program resulting from the register allocation for the codes shown in FIG. 12 by the register allocator 37.

Register reallocation is performed in such a way that Rp1, Rp2, Rt1, Rt2 and Rp3 allocated as pseudo registers in FIG. 12 are changed to real registers Ri, Rj, R1, R2, and Rk that the target CPU has.

When there are not sufficient of registers in the register allocation, control is returned again to the code allocator 36 so that part of instructions are modified not to use registers and instruction allocation is reperformed. The register allocation is then performed again.

In this manner, an object program for CPUs that support predicated execution is generated.

Here, the number of cycles required to execute the generated program is calculated as follows: In general, in the CPU that performs pipeline control, a delay of one cycle is involved in execution when an unconditional or conditional branch instruction causes a branch. No delay occurs when a conditional branch instruction causes no branch. In the case of the program shown in FIG. 13, each of cycles (11-1), (11-2), (11-3), (11-4), (11-5) is executed in one clock cycle. Thus, B2 can be executed in a total of five clock cycles. On the other hand, the execution of B3 requires a total of four clock cycles: three clock cycles for (11-1), (11-2), (11-3) and one clock cycle associated with the delay caused by a branch in (11-3).

Next, a second embodiment of the present invention will be described.

The second embodiment is the same as the first embodiment except that a procedure to be described later is added to the procedure of the first embodiment. Hereinafter, the second embodiment will be described mainly in terms of the difference with respect to the first embodiment.

Figure 14:
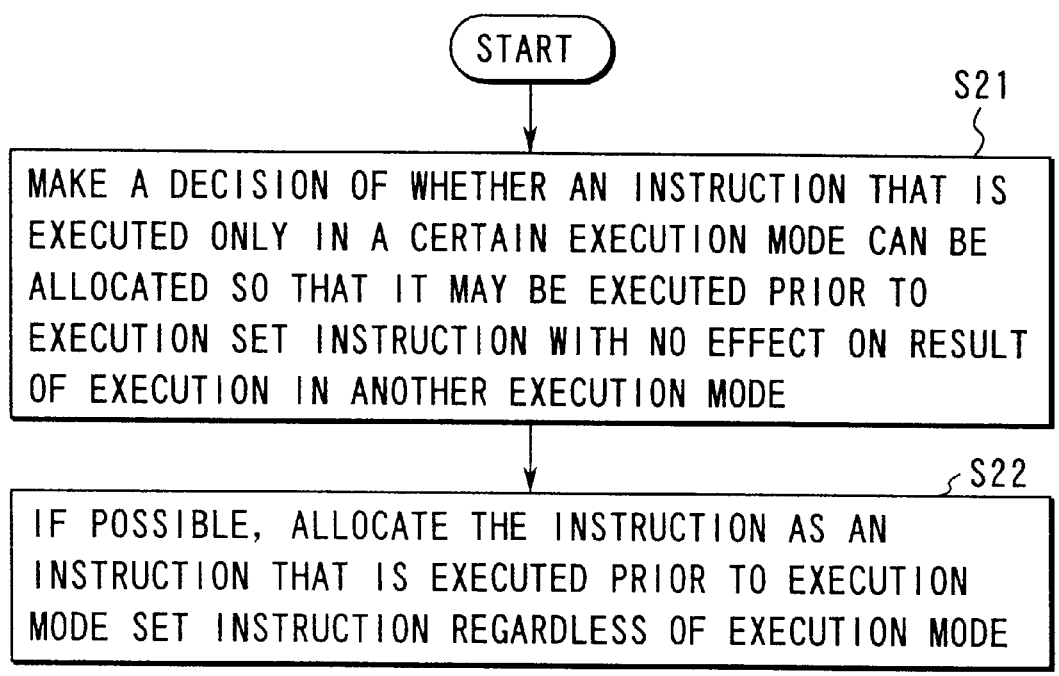
FIG. 14 is a flowchart illustrating an instruction allocation procedure.

The second embodiment involves, in the allocation processing of the first embodiment, making a decision of whether an instruction that is executed only in a certain execution mode can be allocated so that it may be executed prior to the execution mode set instruction (that is, whether such allocation has no effect on the result of execution in another execution mode) and, when the decision is that the allocation is possible, allocating that instruction as an. instruction that is executed prior to the execution mode set instruction regardless of the execution mode. This processing flow is shown in FIG. 14. This processing is carried out in the code allocator 36. That is, the instruction allocation procedure of this embodiment has the procedure of FIG. 14 added to step S9-7 in the first embodiment procedure of FIG. 11.

FIG. 15 shows an example of an object program resulting from instruction allocation and register allocation of this embodiment for the source program illustrated in FIG. 7. This source program differs from the source program of FIG. 13 according to the first embodiment in that, in FIG. 15, the two instructions, Idi and Idui, are shifted from after L1 to before L1 and the predicate field is set to 0.

In FIG. 13, since R1 is a temporary register, that is, the prior execution of the two instructions of Idi and Idui is allowed regardless of the execution mode to be set, the two instructions are shifted to before L1. Further, since the instruction to be put into prior execution is executed before an execution mode is set, its predicate field is set to 0.

Thus, when B2 is executed, four clock cycles are required, speeding up the processing by one clock cycle. However, when B3 is executed, there is no change in the required number of clock cycles.

The second embodiment can be implemented independently of the first embodiment processing of generating and allocating unconditional branch instructions. In this case, the processing corresponding to steps S9-8 and S9-9 in FIG. 11 is omitted. In this case, the result for the source program of FIG. 7 is such that "b(2) L3" in FIG. 15 is changed to nop.

Next, a third embodiment of the present invention will be described.

The third embodiment is the same as the first embodiment except that a procedure to be described later is added to the procedure of the first embodiment. Hereinafter, the third embodiment will be described mainly in terms of the difference with respect to the first embodiment.

This embodiment involves, in the allocation processing of the first embodiment, making a comparison between instruction sequences, instructions in each of the instruction sequences being equal to each other in the value in their predicate field, and, in the presence of equivalent instructions, translating them into instructions that are executed regardless of execution mode. This processing flow is illustrated in FIG. 16. This processing is carried out in the code allocator 36. That is, the instruction allocation procedure of this embodiment has the procedure of FIG. 16 added to step S9-7 in the first embodiment procedure of FIG. 11.

FIG. 17 shows an example of a source program, which differs from the source program of FIG. 7 in (5-8) and (13-8). That is, this source program is such that, when the condition i<j is true, an integer array a[i] value is substituted into k, otherwise an integer array a[j] value is substituted.

FIG. 18 shows an example of an object program resulting from instruction allocation and register allocation with priority to B3 in accordance with the procedure of the first embodiment. When B2 is executed, a total of seven clock cycles is required from (14-1) to (14-7). When B3 is executed, six clock cycles are required: five clock cycles from (14-1) to (14-5) and one clock cycle associated with the delay involved in branching.

FIG. 19 shows an example of an object program resulting from instruction allocation and register allocation with priority to B3 in accordance with the procedure of the second embodiment. The three instructions Idi, Idui and Id are each common to B2 and 13. In this example, therefore, the number of instructions is reduced by converting such instructions to ones that are executed in execution mode 0 and by allowing B2 and B3 to share them. Thus, the execution of either of B2 and B3 is completed in five clock cycles from (15-1) to (15-5). In the third embodiment, no unconditional branch instruction is generated.

The third embodiment can be implemented independently of the first embodiment processing of generating and allocating unconditional branch instructions. In this case, the processing corresponding to steps S9-8 and S9-9 in FIG. 11 is omitted. In this case, the result for the source program of FIG. 17 remains unchanged from in FIG. 19.

The second embodiment processing and the third embodiment processing can be implemented in combination. In this case, the result for the source program of FIG. 17 is shown in FIG. 20.

Further, even in the combined implementation, it is also possible not to perform the first embodiment processing of generating and allocating unconditional branch instructions. In this case, the processing corresponding to steps S9-8 and S9-9 in FIG. 11 is omitted. In this case, the result for the source program of FIG. 17 remains unchanged from FIG. 20.

Next, a fourth embodiment of the present invention will be described.

The fourth embodiment is the same as the first embodiment except that the instruction allocation procedure of the first embodiment is revised.

Hereinafter, the fourth embodiment will be described mainly in terms of the difference with respect to the first embodiment.

The fourth embodiment involves, in generating an execution mode set instruction, identifying an execution mode which, of execution modes, has a high execution count, allocating one or more instructions corresponding to such an execution mode so that they will be executed with no branching, and allocating one or more instructions corresponding to the other execution modes so that they will be executed in one or more cycles other than the one or more cycles in which that one or more instructions are executed.

The instruction allocation procedure implemented by the code allocator 36 in this embodiment will be described below.

Figure 21:
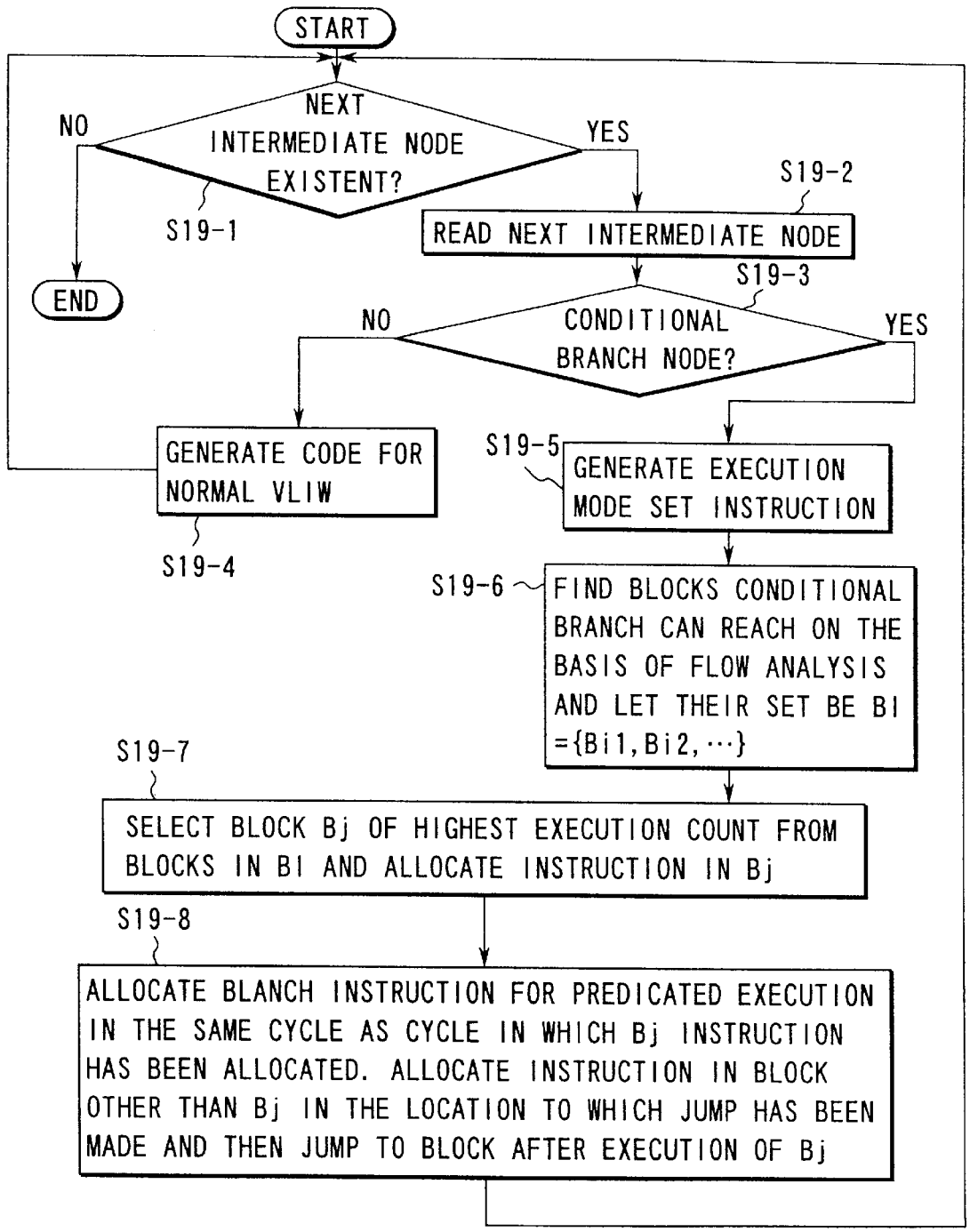
FIG. 21 is a flowchart illustrating another instruction allocation procedure.

FIG. 21 shows an example of an algorithm for instruction allocation according to this embodiment.

It is assumed here that the source program illustrated in FIG. 7 is inputted and the block B3={(5-7), (5-8)} is higher in execution count than the block B2={(5-5), (5-6)}.

FIG. 22 shows an example of an object program generated by the code allocator 36 and the register allocator 37 as a result of application of the algorithm of FIG. 21 to the source program of FIG. 7.

In FIG. 21, steps S19-1 to S19-6 remain unchanged from steps S9-1 to S9-6 in FIG. 11.

That is, through the execution of steps S9-1 to S9-6, an execution mode set instruction is generated when a read-in intermediate node is a conditional branch instruction and, on the basis of flow analysis, BI is then obtained as a set of blocks to which the condition branch is attainable.

In this example, BI={B2, B3} is obtained.

Next, in step S19-7, a block $B_j$ is selected which is of the highest execution count among the blocks in the set BI and one or more instructions in $B_j$ are allocated.

In this example, the block B3 is selected on the basis of the execution counts of the respective blocks in BI and the instruction in B3 is then allocated with its predicate field set to 2. Unlike the first embodiment, the fourth embodiment terminates without allocating an unconditional branch instruction at the final cycle in B3.

Next, in step S19-8, an unconditional a branch instruction for predicated execution is allocated in the same cycle as the cycle in which the $B_j$ instruction has been allocated. One or more instructions in a block other than $B_j$ are allocated in the location to which jump has been made by that unconditional branch instruction and then an unconditional branch instruction is allocated so that jump is made to the block after the execution of the $B_j$ instruction.

In this case, an unconditional branch instruction "b(1) L4" in which the predicate field is 1 is allocated in the same cycle as the cycle in which the B3 instruction has been allocated. The B2 instruction is allocated in the location to which a jump has been made. Lastly, an unconditional branch instruction "b(1) L3" is allocated which causes a branch to the block after the B3 instruction.

Thereby, when a block of high execution count is executed, no branch occurs, allowing high-speed execution. For a block of low execution count, two branches occur.

In the example of FIG. 22, the B3 instruction is allocated in (20-3) that follows (20-1) and (20-2). "Idi(2) Rk, −1" is that instruction. After that, the subsequent block L3 follows with no branch instruction. On the other hand, when B2 is executed, an unconditional jump is made to L4 by "b(1) L4" in (20-3). After the execution of B2, an unconditional jump is made to L3 by "b(1) L3" in (20-6).

Thus, the execution of B3 requires three clock. cycles from (20-1) to (20-3). On the other hand, the execution of B2 requires a total of eight clock cycles: six clock cycles from (20-1) to (20-3) and from (20-4) to (20-6), one clock cycle for branching in (20-3), and one clock cycle for branching in (20-6).

Thus, the employment of the instruction allocation of this embodiment when a block of high execution count can be identified allows very high-speed execution.

Next, a fifth embodiment of the present invention will be described.

The fifth embodiment is the same as the embodiments described thus far except that a procedure to be described later is added to the procedures of the embodiments and modifications thereof. Hereinafter, the fifth embodiment will be described mainly in terms of the difference with respect to the first embodiment.

The fifth embodiment involves, in the allocation processing of the first embodiment, comparing the execution speeds of instructions to be executed only in their respective specific execution mode and instructions to be executed regardless of execution mode and generating the latter when it is higher in execution speed than the former. For comparison of execution speeds, the codes of instructions to be executed only in their respective specific execution mode and instructions to be executed regardless of execution mode may actually be generated and then subjected to comparison. This processing flow is illustrated in FIG. 23. This processing is carried out in the code allocator 36. That is, the instruction allocation procedure of this embodiment has the procedure of FIG. 23 added to step S9-7 in the first embodiment procedure of FIG. 11.

FIG. 24 shows an example of a source program, which differs from the source program of FIG. 7 in (5-8) and (16-8). That is, this source program is such that, when the condition i<j is true, an integer array a[i] value is substituted into k, otherwise an integer array b[j] value is substituted.

FIG. 25 shows an example of an object program resulting from instruction allocation and register allocation with priority to B3 in accordance with the procedure of the first embodiment. When B2 is executed, seven clock cycles are required from (17-1) to (17-7). When B3 is executed, six clock cycles are required: five clock cycles from (17-1) to (17-5) and one clock cycle for the delay involved in branching.

FIG. 26 shows an example of an object program obtained by instruction allocation and register allocation with no predicated execution. The execution of B2 requires six clock cycles: five clock cycles from (18-1) to (18-5) and one clock cycle for the delay involved in branching in (18-5). The execution of 23 requires a total of six clock cycles: five clock cycles for (18-1), (18-2), (18-6) to (18-8) and one clock cycle for the delay involved in branching in (18-2). That is, when the procedure of the first embodiment is applied, B3 requires the same number of clock cycles, and B2 requires an additional one clock cycle.

Thus, due to restrictions on the number of functional units and the number of instructions that can be executed concurrently, the predicated execution does not necessarily provide higher execution speed. If, therefore, it is judged on instruction allocation that the predicated execution is not effective in increasing the execution speed, it is advisable not to perform the predicated execution.

As described previously, the instruction that is executed only in a specific execution mode can be generated by applying optionally the first embodiment, the other embodiments, or modifications thereof.

Each of the embodiments of the present invention has been described on the assumption that instruction allocation is performed within a compiler which is software for translating a source program described in a high-level language to an object program to be run on a target CPU or computer. However, the present invention can be applied to direct programming using an assembler language or the like with the architecture of a target CPU or computer in mind.

Each of the embodiments described so far does not generate any instruction that resets the execution mode register to 0 after the execution of an instruction corresponding to BI. This is because an execution mode-independent instruction (an instruction in which the predicate field value is 0) is generated after the execution of the instruction corresponding to BI and hence all instructions are executed even if the execution mode is not reset to the initial value. To perform predicated execution again, an execution mode set instruction is simply executed immediately prior to it. Resetting the execution mode to the initial value requires the execution of one instruction, which decreases the execution speed.

As described previously, the present invention is also implementable in software that causes a computer to run.

Figure 27:
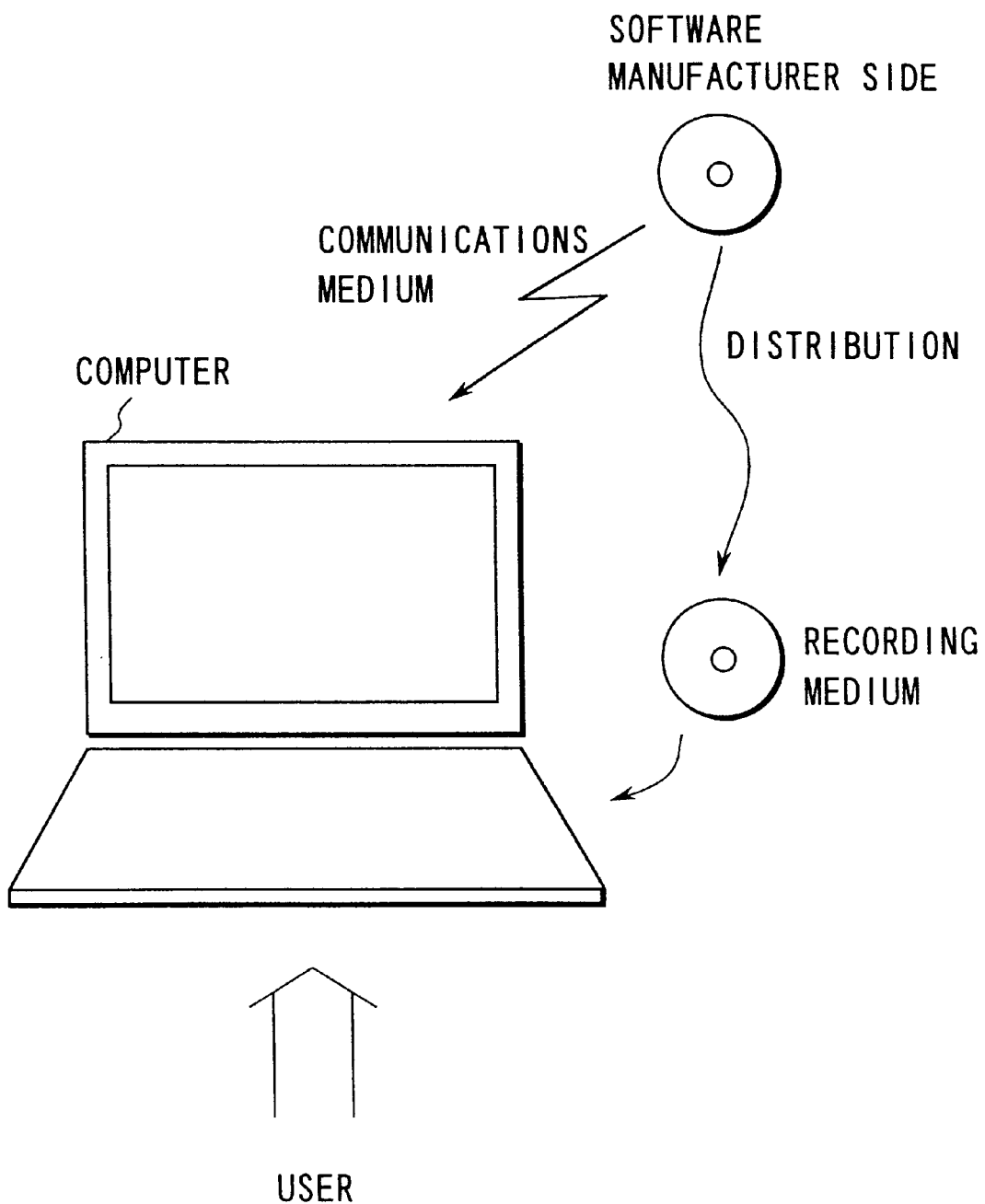
FIG. 27 is a diagram for use in explanation of a software implementation of the inventive method.

That is, as shown in FIG. 27, inventive software which involves the concept of the present invention can be distributed to users in the form of a recording on a computer-readable recording medium. The users can read the distributed software from the recording medium into a computer and put it into execution.

The inventive software can be distributed installed onto a computer's recording medium. In addition, the inventive software can be distributed through a communications medium such as a network.

Furthermore, the inventive software may be either that which is to be run on target CPUs of compilation or that which is to be run on CPUs differing from the target CPUs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compiling method for compiling a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the compiling method comprising the steps (a)–(d) of:

(a) analyzing said source program and generating intermediate codes;

(b) making an analysis of said intermediate codes;

(c) allocating instructions from said intermediate codes based on said analysis; and (d) generating said object program from said allocated instructions, wherein the step (c) includes the steps (i)–(iv) of:

(i) allocating an execution mode setting instruction to set the execution mode managed within the CPU;

(ii) allocating instructions, such that whether the instructions are to be executed or not depends on the execution mode set by the execution mode setting instruction;

(iii) finding an ending part of each of a plurality of blocks, in which its last instruction is allocated, said each of a plurality of blocks comprising one or more instructions of said allocated instructions that are identical in specific field value; and a block differing from another block in specific field value; and (iv) when an ending part of a certain block is to be earlier in said object program than an ending part of another block, allocating an unconditional branch instruction identical in specific field value to the instructions in the certain block, either to be executed in the ending part of the certain block or to be executed as soon as possible after the ending part of the block.

2. The method according to claim 1, wherein an execution mode which is high in execution count is identified, and an instruction in the block corresponding to the execution mode of high execution count is allocated, to be executed earlier in the object program on a preferential basis.

3. The method according to claim 1, wherein, no instruction to reset the execution mode to an initial state is allocated, if an execution, which depends on the execution mode, becomes unnecessary.

4. The method according to claim 1, wherein the execution mode setting instruction sets an execution mode according to whether a branch condition is true or not.

5. The method according to claim 1, wherein, when the instruction code has a predetermined specific value in the specific field, the instruction is executed regardless of the execution mode managed within the CPU, and, when the instruction code has a value in the specific field which is not the specific value, the instruction is executed only when a coincidence occurs between an execution mode indicated by the specific field value and the execution mode managed within the CPU.

6. A compiling method for compiling a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the compiling method comprising the steps (a)–(d) of:

(a) analyzing said source program and generating intermediate codes;

(b) making an analysis of said intermediate codes;

(c) allocating instructions from said intermediate codes based on said analysis; and (d) generating said object program from said allocated instructions, wherein the step (c) includes the steps (i)–(iv) of:

(i) allocating an execution mode setting instruction to set an execution mode managed within the CPU;

(ii) allocating instructions, such that whether the instructions are to be executed or not on the execution mode set by the execution mode setting instruction;

(iii) making a decision on whether an instruction, which is executed only when an execution mode set by the execution mode setting instruction is a certain specific value, can be allocated so that the instruction may be executed before the execution mode setting instruction or not; and (iv) if the decision is affirmative, translating the instruction into an instruction which is executed regardless of the execution mode and allocating the instruction to be executed before the execution mode setting instruction.

7. The method according to claim 6, wherein an execution mode which is high in execution count is identified, and an instruction in the block corresponding to the execution mode of high execution count is allocated, to be executed earlier in the object program on a preferential basis.

8. The method according to claim 6, wherein, no instruction to reset the execution mode to an initial state is allocated, if an execution, which depends on the execution mode, becomes unnecessary.

9. The method according to claim 6, wherein the execution mode setting instruction sets an execution mode according to whether a branch condition is true or not.

10. The method according to claim 6, wherein, when the instruction code has a predetermined specific value in the specific field, the instruction is executed regardless of the execution mode managed within the CPU, and, when the instruction code has a value in the specific field which is not the specific value, the instruction is executed only when a coincidence occurs between an execution mode indicated by the specific field value and the execution mode managed within the CPU.

11. A compiling method for compiling a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the compiling method comprising the steps (a)–(d) of:

(a) analyzing said source program and generating intermediate codes;

(b) making an analysis of said intermediate codes;

(c) allocating instructions from said intermediate codes based on said analysis; and (d) generating said object program from said allocated instructions;

wherein the step (c) includes the steps (i)–(iv) of:

(i) allocating an execution mode setting instruction to set an execution mode managed within the CPU;

(ii) allocating instructions, such that whether the instructions are to be executed or not depends on the execution mode set by the execution mode setting instruction;

(iii) comparing one or more instructions of a plurality of blocks, said plurality of blocks each comprising one or more instructions of said allocated instructions that are identical in specific field value, and a block differing from another block in specific field value; and (iv) when it is found that an equivalent instruction is present in all of said plurality of blocks, translating said equivalent instruction into an instruction that is executed regardless of the execution mode.

12. The method according to claim 11, wherein an execution mode which is high in execution count is identified, and an instruction in the block corresponding to the execution mode of high execution count is allocated, to be executed earlier in the object program on a preferential basis.

13. The method according to claim 11, wherein, no instruction to reset the execution mode to an initial state is allocated, if an execution, which depends on the execution mode, becomes unnecessary.

14. The method according to claim 11, wherein the execution mode setting instruction sets an execution mode according to whether a branch condition is true or not.

15. The method according to claim 11, wherein, when the instruction code has a predetermined specific value in the specific field, the instruction is executed regardless of the execution mode managed within the CPU, and, when the instruction code has a value in the specific field which is not the specific value, the instruction is executed only when a coincidence occurs between an execution mode indicated by the specific field value and the execution mode managed within the CPU.

16. A compiling method for compiling a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the compiling method comprising the steps (a)–(d) of:

(a) analyzing said source program and generating intermediate codes;

(b) making an analysis of said intermediate codes;

(c) allocating instructions from said intermediate codes based on said analysis; and (d) generating said object program from said allocated instructions, wherein the step (c) includes the steps (i)–(iii) of:

(i) allocating an execution mode setting instruction to set the execution mode managed within the CPU;

(ii) identifying a block which is high in execution count, the block comprising one or more instructions of said allocated instructions that arc identical in specific field value, and a block differing from another block in specific field value; and (iii) allocating instructions, such that whether the instructions are to be executed or not depends on the execution mode set by the execution mode setting instruction, an instruction included in the block identified to be high in execution count being allocated so that the instruction is executed without branching from the execution mode setting instruction, and an instruction included in another block being allocated so that the instruction is executed with branching from the execution mode setting instruction.

17. The method according to claim 16, wherein the instruction corresponding to the other execution mode is allocated to a location to which a branch is caused, and an unconditional branch instruction to make a jump to the beginning of an instruction that follows the final instruction corresponding to the execution mode identified to be high in execution count is allocated at the ending location of the instruction corresponding to the other execution mode.

18. The method according to claim 16, wherein, no instruction to reset the execution mode to an initial state is allocated, if an execution, which depends on the execution mode, becomes unnecessary.

19. The method according to claim 16, wherein the execution mode setting instruction sets an execution mode according to whether a branch condition is true or not.

20. The method according to claim 16, wherein, when the instruction code has a predetermined specific value in the specific field, the instruction is executed regardless of the execution mode managed within the CPU, and, when the instruction code has a value in the specific field which is not the specific value, the instruction is executed only when a coincidence occurs between an execution mode indicated by the specific field value and the execution mode managed within the CPU.

21. A compiling method for compiling a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the compiling method comprising the steps (a)–(d) of:

(a) analyzing said source program and generating intermediate codes;

(b) making an analysis of said intermediate codes;

(c) allocating instructions from said intermediate codes based on said analysis; and (d) generating said object program from said allocated instructions, wherein the step (c) includes the steps (i)–(iv) of:

(i) allocating an execution mode setting instruction to set the execution mode managed within the CPU;

(ii) allocating instructions, such that whether the instructions are to be executed or not depends on the execution mode set by the execution mode setting instruction;

(iii) comparing an execution speed at which the CPU executes instructions that are allocated to be executed only in their respective specific execution modes, with an execution speed at which the CPU executes instructions that are allocated to be executed regardless of the execution mode; and (iv) allocating instruction to be executed regardless of the execution mode if the execution speed at which the CPU executes instructions that are allocated to be executed regardless of the execution mode being higher than the execution speed at which the CPU executes instructions that are allocated to be executed on in their respective specific execution modes.

22. The method according to claim 21, wherein, no instruction to reset the execution mode to an initial state is allocated, if an execution, which depends on the execution mode, becomes unnecessary.

23. A memory storing computer-executable program code to compile a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the program code comprising:

(a) means for causing a computer to analyze said source program and generate intermediate codes;

(b) means for causing a computer to make an analysis of said intermediate codes;

(c) means for causing a computer to allocate instructions from said intermediate codes based on said analysis; and (d) means for causing a computer to generate said object program from said allocated instructions;

wherein the means (c) includes:

(i) means for causing a computer to allocate an execution mode setting instruction to set an execution mode managed within the CPU;

(ii) means for causing a computer to allocate instructions, such that whether the instructions are to be executed or not to be executed depends on the execution mode set by the execution mode setting instruction;

(iii) means for causing a computer to find an ending part of each plurality of blocks, in which its last instruction is allocated, said each of plurality of blocks comprising one or more instructions of said allocated instructions that are identical in specific value, and a block differing from another block in specific field value; and (iv) means for causing a computer, when an ending part of a certain block is to be earlier in said object program than an ending part of another block, to allocate an unconditional branch instruction identical in specific field value to the instructions in the certain block, either to be executed in the ending part of the certain block or to be executed as soon as possible after the ending part of the block.

24. A memory storing computer-executable program code to compile a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the computer-executable program code comprising:

(a) means for causing a computer to analyze said source program and generate intermediate codes;

(b) means for causing a computer to make an analysis of said intermediate codes;

(c) means for causing a computer to allocate instructions from said intermediate codes based on said analysis; and (d) means for causing a computer to generate said object program from said allocated instructions, wherein the means (c) includes:

(i) means for causing a computer to allocate an execution mode setting instruction to set the execution mode managed within the CPU;

(ii) means for causing a computer to allocate instructions, such that whether the instructions are to be executed or not depends on the execution mode set by the execution mode setting instruction;

(iii) means for causing a computer to make a decision on whether an instruction, which is executed only when an execution mode set by the execution mode setting instruction is a certain specific value, can be allocated so that the instruction may be executed before the execution mode setting instruction or not; and (iv) means for causing a computer to translate an instruction into an instruction which is executed regardless of the execution mode and to allocate the instruction to be executed before the execution mode setting instruction if the decision is affirmative.

25. A memory storing compute-executable program code to compile a source program into an object program for a CPU having multiple functional units that allow for concurrent operations and having a function of executing an instruction only when there is a predetermined relationship between an execution mode indicated by a value in a specific field in and instruction code and an execution mode managed within the CPU, the program code comprising:

(a) means for causing a computer to analyze said source program and generate intermediate codes;

(b) means for causing a computer to make an analysis of said intermediate codes;

(c) means for causing a computer to allocate instructions from said intermediate codes based on said analysis; and (d) means for causing a computer to generate said object program from said allocated instructions, wherein the means (c) includes:

(i) means for causing a computer to allocate an execution mode setting instruction to set the execution mode managed within the CPU;

(ii) means for causing a computer to allocate instructions, such that whether the instructions are to be executed or not depends on the execution mode set by the execution mode setting instruction;

(iii) means for causing a computer to compare one or more instructions of a plurality of blocks, said plurality of blocks each comprising one or more instructions of said allocated instructions that are identical in specific field value, and a block differing from another block in specific field value; and (iv) means for causing a computer, when it is found that an equivalent instruction is present in all of said plurality of blocks, to translate said equivalent instruction into an instruction that is executed regardless of the execution mode.

26. A memory storing computer-executable program code to compile a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the program code comprising:

(a) means for causing a computer to analyze said source program and generate intermediate codes;

(b) means for causing a computer to make an analysis of said intermediate codes;

(c) means for causing a computer to allocate instructions from said intermediate codes based on said analysis; and (d) means for causing a computer to generate said object program from said allocated instructions, wherein the means (c) includes:

(i) means for causing a computer to allocate an execution mode setting instruction to set the execution mode managed with the CPU;

(ii) means for causing a computer to identify a block which is high in execution count, the block comprising one or more instructions of said allocated instructions that are identical in specific field value, and a block differing from another block in specific field value; and (iii) means for causing a computer to allocate instructions, such that whether the instructions are to be executed or not depends on the execution mode set by the execution mode setting instruction, an instruction included in the block identified to be high in execution count being allocated so that the instruction is executed without the branching from the execution mode setting instruction and an instruction included in another block being allocated so that the instruction is executed with branching from the execution mode setting instruction.

27. A memory storing computer-executable program code to compile a source program into an object program for a CPU having multiple functional units that allow for concurrent operations and having a function of executing an instruction only when there is a predetermined relationship between an execution mode indicated by a value in a specific field in an instruction code and an execution mode managed within the CPU, the program code comprising:

(a) means for causing a computer to analyze said source program and generate intermediate codes;

(b) means for causing a computer to make an analysis of said intermediate codes;
(c) means for causing a computer to allocate instructions from said intermediate codes based on said analysis; and
(d) means for causing a computer to generate said object program from said allocated instructions, wherein the means (c) includes:
   (i) means for causing a computer to allocate an execution mode setting instruction to set the execution mode managed with the CPU;
   (ii) means for causing a computer to allocate instructions, such that whether the instructions are to be executed or not depends on the execution mode set by the execution mode setting instruction;
   (iii) means for causing a computer to compare an execution speed at which the CPU executes instructions that are allocated to be executed only in their respective specific execution modes, with an execution speed at which the CPU executes instructions that are allocated to be executed regardless of the execution mode; and
   (iv) means for causing a computer to allocate instructions to be executed regardless of the execution mode if the execution speed at which the CPU executes instructions that are allocated to be executed regardless of the execution mode being higher than the execution speed at which the CPU executes instructions that are allocated to be executed only in their respective specific execution modes.

* * * * *